United States Patent
Ichinokawa

(10) Patent No.: US 10,854,172 B2
(45) Date of Patent: Dec. 1, 2020

(54) DISPLAY SYSTEM, DISPLAY CONTROL METHOD, AND STORAGE MEDIUM

(71) Applicant: HONDA MOTOR CO., LTD., Tokyo (JP)

(72) Inventor: Jumpei Ichinokawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/684,608

(22) Filed: Nov. 15, 2019

(65) Prior Publication Data

US 2020/0168180 A1 May 28, 2020

(30) Foreign Application Priority Data

Nov. 27, 2018 (JP) .................. 2018-221427

(51) Int. Cl.
*G09G 5/373* (2006.01)
*G06T 11/00* (2006.01)
(Continued)

(52) U.S. Cl.
CPC ............ *G09G 5/373* (2013.01); *B60K 35/00* (2013.01); *G06K 9/00798* (2013.01); *G06T 11/00* (2013.01); *G09G 5/38* (2013.01); *B60K 2370/1529* (2019.05); *B60K 2370/166* (2019.05); *B60K 2370/167* (2019.05); *B60K 2370/52* (2019.05); *G09G 2340/0464* (2013.01); *G09G 2380/10* (2013.01)

(58) Field of Classification Search
CPC .......... G09G 5/373; G09G 5/38; B60K 35/00; G06T 11/00; G06T 19/00; G06T 17/00; G06T 7/00; G06T 19/006; G06T 2215/16; G06K 9/00; G06K 9/00664–00704; G06F 2111/18; G06F 3/0481; G06F 3/04817; G06F 9/4443; G06F 3/04847; G06F 11/3664; G06F 3/012; G06F 3/0304; G06F 3/011–015; H04N 5/272; H04N 2201/3245; A63F 13/10
See application file for complete search history.

(56) References Cited

U.S. PATENT DOCUMENTS 8,620,025 B2 * 12/2013 Higuchi ................. G08G 1/165
 382/103
9,074,906 B2 * 7/2015 Higuchi .................... G06T 7/70
(Continued)

FOREIGN PATENT DOCUMENTS

JP 2008-064517 3/2008

*Primary Examiner* — Todd Buttram
(74) *Attorney, Agent, or Firm* — Amin, Turocy & Watson, LLP

(57) ABSTRACT

A display system includes a display configured to superimpose an image on a landscape in front of a vehicle and cause the image to be visually recognized by an occupant of the vehicle, a road shape acquirer configured to acquire information indicating a shape of a road around the vehicle, and a display controller configured to change a display aspect of an image regarding a road to be displayed on the display, on the basis of a form of a roundabout including one or both of a shape component and an outer diameter of the roundabout obtained from the information in a case that the roundabout has been determined to be included in the road shape by referring to the information acquired by the road shape acquirer.

8 Claims, 10 Drawing Sheets

(51) Int. Cl.
  G09G 5/38 (2006.01)
  G06K 9/00 (2006.01)
  B60K 35/00 (2006.01)

(56) References Cited

U.S. PATENT DOCUMENTS

| | | | |
|---|---|---|---|
| 10,259,322 B2* | 4/2019 | Brandin | B60W 30/14 |
| 2017/0103653 A1* | 4/2017 | Satomura | G08G 1/0968 |
| 2019/0001993 A1* | 1/2019 | Visintainer | B60W 50/14 |

* cited by examiner

| VEHICLE POSITION | FORM OF ROUNDABOUT | DISPLAY ASPECT OF IMAGE | | |
|---|---|---|---|---|
| | | DISPLAY ASPECT OF STRAIGHT LINE IMAGE | DISPLAY ASPECT OF ARC IMAGE | DISPLAY ASPECT OF EXIT LANE IMAGE |
| * * * | * * * | * * * | * * * | * * * |
| * * * | * * * | * * * | * * * | * * * |
| ... | ... | ... | ... | ... |

DISPLAY SYSTEM, DISPLAY CONTROL METHOD, AND STORAGE MEDIUM

CROSS-REFERENCE TO RELATED APPLICATION

Priority is claimed on Japanese Patent Application No. 2018-221427, filed on Nov. 27, 2018, the content of which is incorporated herein by reference.

BACKGROUND

Field of the Invention

The present invention relates to a display system, a display control method, and a storage medium.

Description of Related Art

In the related art, there is a driving assistance system that displays a route to a destination on a screen and assists in driving of a driver. In connection therewith, there is a technology for performing a two-screen display when a roundabout is equal to or larger than a predetermined size (for example, Japanese Unexamined Patent Application, First Publication No. 2008-64517).

SUMMARY

However, in the related art, a case in which an image is superimposed on a front landscape using an augmented reality (AR) technology, and an occupant is caused to visually recognize the image has not been considered. Therefore, the occupant has been likely to be unable to recognize a road situation at the roundabout.

The present invention has been made in consideration of such circumstances, and an object of the present invention is to provide a display system, a display control method, and a storage medium capable of allowing an occupant to more accurately ascertain a road situation at a roundabout.

A display system, a display control method, and a storage medium according to the present invention employ the following configurations.

(1) A display system according to an aspect of the present invention is a display system including: a display configured to superimpose an image on a landscape in front of a vehicle and cause the image to be visually recognized by an occupant of the vehicle; a road shape acquirer configured to acquire information indicating a shape of a road around the vehicle; and a display controller configured to change a display aspect of an image regarding a road to be displayed on the display, on the basis of a form of a roundabout including one or both of a shape component and an outer diameter of the roundabout obtained from the information in a case that the roundabout has been determined to be included in the road shape by referring to the information acquired by the road shape acquirer.

(2) In the aspect (1), the display controller causes an arc image associated with a curvature of the road shape of the roundabout to be displayed on the display, and includes, in an image to be displayed on the display, a straight line image associated with a straight line component in a case that the straight line component is included in the road shape of the roundabout.

(3) In the aspect (2), the display controller changes a length of the straight line image to be displayed on the display, on the basis of a position of the vehicle and a form of the roundabout in a case that the vehicle travels on a road of the straight line component.

(4) In the aspect (3), in a case that the display controller changes the length of the straight line image to be displayed on the display, the display controller causes an image with a distal end portion of the arc image extending in association with the curvature to be displayed on the display, on the basis of the change in the length of the straight line image.

(5) In the aspect (2), in a case that the outer diameter of the roundabout is smaller than a predetermined value, the display controller causes an image with a component of a curve included in a distal end portion of the arc image to be displayed on the display, the component of the curve approaching a reference point of the curve in a road width direction as the vehicle turns.

(6) In the aspect (1), the display controller causes an image regarding an exit of the roundabout to be displayed at a position associated with an image regarding the roundabout.

(7) A display control method according to an aspect of the present invention is a display control method performed using a computer including: acquiring information indicating a shape of a road around a vehicle; and changing a display aspect of an image regarding a road to be displayed on a display, the display superimposing an image on a landscape in front of the vehicle and causing the image to be visually recognized by an occupant of the vehicle, on the basis of a form of a roundabout including one or both of a shape component and an outer diameter of the roundabout obtained from the information in a case that the roundabout has been determined to be included in the road shape by referring to the acquired information.

(8) A program according to an aspect of the present invention is a computer-readable non-transitory storage medium storing a program, the program causing a computer to: acquire information indicating a shape of a road around a vehicle; and change a display aspect of an image regarding a road to be displayed on a display, the display superimposing an image on a landscape in front of the vehicle and causing the image to be visually recognized by an occupant of the vehicle, on the basis of a form of a roundabout including one or both of a shape component and an outer diameter of the roundabout obtained from the information in a case that the roundabout has been determined to be included in the road shape by referring to the acquired information.

According to (1) to (8), it is possible to allow the occupant to ascertain a road situation at the roundabout more accurately.

BRIEF DESCRIPTION OF THE DRAWINGS

FIG. 5 is a diagram showing an example of content of a display aspect determination table 156A.

DETAILED DESCRIPTION OF THE INVENTION

Hereinafter, embodiments of a display system, a display control method, and a program of the present invention will be described with reference to the drawings. In the embodiment, an example in which the display system is mounted in a vehicle including a driving assistance device such as advanced driver assistance systems (ADAS) or a navigation device that performs guidance for a route to a destination will be described. In the embodiment, the driving assistance includes, for example, an adaptive cruise control system (ACC), a lane keeping assistance system (LKAS), and a collision mitigation brake system (CMBS). Hereinafter, a case in which left-hand driving is applied will be described, but right and left may be reversed when right-hand driving is applied.

Overall Configuration

Figure 1:
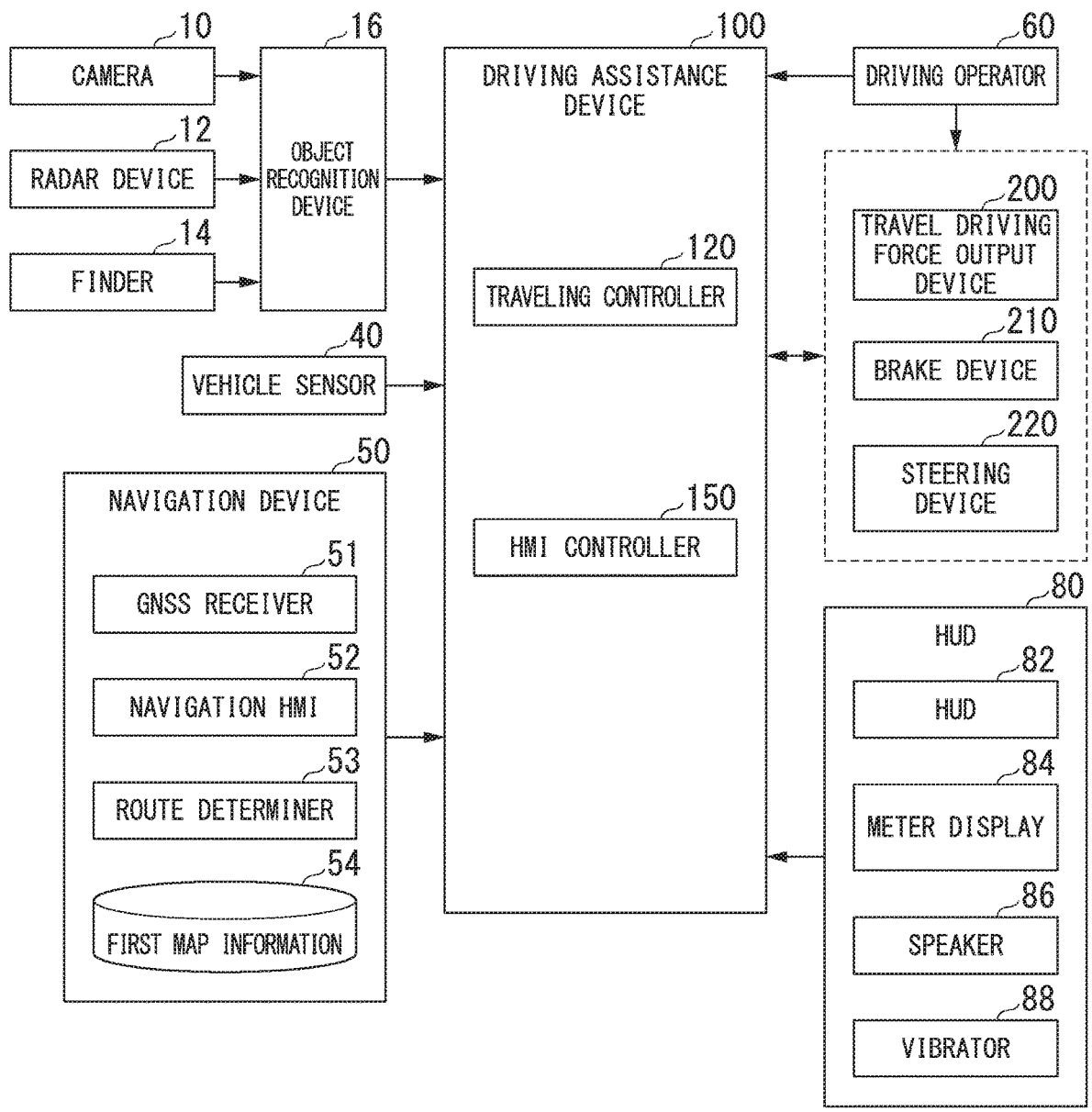
FIG. 1 is a configuration diagram of a vehicle system 1 including a display system according to an embodiment.

FIG. 1 is a configuration diagram of a vehicle system 1 including the display system of the embodiment. A vehicle (hereinafter referred to as a vehicle M) in which the vehicle system 1 is mounted is, for example, a vehicle such as a two-wheeled, three-wheeled, or four-wheeled vehicle. A driving source thereof is an internal combustion engine such as a diesel engine or a gasoline engine, an electric motor, or a combination thereof. The electric motor is operated using power generated by a generator connected to the internal combustion engine, or discharge power of a secondary battery or a fuel cell.

In FIG. 1, the vehicle system 1 includes, for example, a camera 10, a radar device 12, a finder 14, an object recognition device 16, a vehicle sensor 40, a navigation device 50, a driving operator 60, a human machine interface (HMI) 80, a driving assistance device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration of the vehicle system 1 shown in FIG. 1 is merely an example, and a part of the configuration may be omitted, or another configuration may be added thereto. A combination of the navigation device 50, the HMI 80, and an HMI controller 150 is an example of the "display system".

The camera 10 images an area around the vehicle M to generate a captured image. The camera 10 is, for example, a digital camera using a solid-state imaging element such as a charge coupled device (CCD) or a complementary metal oxide semiconductor (CMOS). The camera 10 is attached to any location on the vehicle M in which the vehicle system 1 is mounted. The area around the vehicle M includes an area in the front of the vehicle M, and may include areas on sides of the vehicle M or an area behind the vehicle M. For example, in a case in which the camera 10 images the area in front of the vehicle M, the camera 10 is attached to an upper portion of a front windshield, a rear surface of a rearview mirror, or the like. The camera 10 may be a stereo camera.

The radar device 12 radiates radio waves such as millimeter waves in a predetermined radiation direction around the vehicle M and detects radio waves (reflected waves) reflected by an object to detect at least a position (distance and orientation) of the object. The object is, for example, another vehicle, a person, a structure, a tree, and an obstacle that obstructs traveling, which are present around the vehicle M, (including, for example, a parked vehicle or a pedestrian present in front of the vehicle M). One or a plurality of radar devices 12 are attached to any locations on the vehicle M. The radar device 12 may detect a position and a speed of the object using a frequency modulated continuous wave (FM-CW) scheme.

The finder 14 is a light detection and ranging device or a laser imaging detection and ranging (LIDAR) device that measures scattered light with respect to irradiation light that has been radiated in the predetermined radiation direction around the vehicle M to detect a distance to the object. One or a plurality of finders 14 are attached at any locations on the vehicle M.

The object recognition device 16 performs a sensor fusion process on detection results of some or all of the camera 10, the radar device 12, and the finder 14 to recognize a position, type, speed, and the like of an object around the vehicle M. The object recognition device 16 may recognize a shape of a road around the vehicle M through the sensor fusion process. Information on the recognized road shape may include, for example, information such as the number of lanes of the road, a curvature thereof, and the presence or absence of a roundabout. The roundabout is, for example, an intersection at which an annular shape (including circular or elliptical shape) is included in a part or all of a passing portion of a vehicle. An area serving as a reference for turning of the vehicle (hereinafter referred to as a central island) is provided in the vicinity of a center of the annular shape. At the roundabout, the vehicle passes through the passing portion (hereinafter referred to as a circular road) within the roundabout in a predetermined direction (for example, clockwise). The object recognition device 16 outputs recognition results to the driving assistance device 100.

The vehicle sensor 40 includes, for example, a vehicle speed sensor that detects a speed of the vehicle M (hereinafter referred to as a vehicle speed), an acceleration sensor that detects an acceleration, a yaw rate sensor that detects an angular speed around a vertical axis, and an orientation sensor that detects a direction of the vehicle M.

The navigation device 50 includes, for example, a global navigation satellite system (GNSS) receiver 51, the navigation HMI 52, and a route determiner 53, and holds map information 54 in a storage device such as a hard disk drive (HDD) or a flash memory. The map information 54 may be stored in a storage 156 to be described below. The map information 54 is, for example, information in which a road shape is represented by links indicating roads and nodes connected by the links. The map information 54 may include a link shape, traffic regulations, a road type, a lane width, the number of lanes, a road structure, a road curvature, presence or absence and a form of a roundabout, sign information, point of interest (POI) information, and the like. The form of the roundabout includes, for example, one or both of a shape component or an outer diameter in an annular shape portion. The shape component includes, for example, an arc component and a straight line component. The arc component is the shape component of the road of which a curvature is equal to or greater than a first threshold value (or a curvature radius is smaller than a second threshold value), and the straight line component is the shape component of the road regarded as a straight line of which a curvature is smaller than the first threshold value (or a curvature radius is equal to or greater than the second threshold value). The shape component of the road may be set for each predetermined road section at the roundabout. Therefore, the roundabout may include, for example, only the arc component or may include the arc component and the straight line component. The sign information includes, for example, a road name, road identification information, a speed limit, traffic regulations (one-way traffic, a straight ahead lane, a right turn lane, and no parking), and information (for example, an area or a road) on a destination of a road. The map information 54 may include, for example, information on a center of a lane or information on a boundary between lanes.

The GNSS receiver 51 specifies a position of the vehicle M on the basis of a signal received from a GNSS satellite. The navigation HMI 52 includes a display device, a speaker, a touch panel, keys, and the like. The navigation HMI 52 may be partly or wholly shared with the HMI 80 to be described below. The route determiner 53, for example, determines a route from the position of the vehicle M (or any input position) specified by the GNSS receiver 51 to a route to a destination (including, for example, information on stops passed by when the vehicle M travels to the destination) input by an occupant (including a driver) using the navigation HMI 52, and a recommended lane based on the route to the destination by referring to the map information 54. The route determiner 53 divides the route on the map to the destination into a plurality of blocks (for example, divides the route every 100 [m] in a traveling direction of the vehicle) and determines a recommended lane for each separate block. The route determiner 53 determines, for example, in which lane from the left the vehicle M travels when the recommended lane is determined. The route determiner 53 determines the recommended lane so that it becomes easy for the vehicle M to travel in a destination direction at a branching destination or a merging destination when there is a branching location or a merging location in the route on the map. The navigation device 50 performs route guidance using the navigation HMI 52 on the basis of the route determined by the route determiner 53 when the navigation device 50 operates, or the recommended lane.

The driving operator 60 is, for example, an operator that is used for the driver to control steering and a speed of the vehicle M through manual driving. The driving operator 60 includes, for example, an accelerator pedal, a brake pedal, a shift lever, and a steering wheel.

The HMI 80 outputs various types of information to the occupant of the vehicle M and receives an input operation from the occupant. The HMI 80 includes, for example, various display devices such as a HUD 82 and a meter display 84, a speaker 86, and a vibrator 88. The HUD 82 or the meter display 84 are examples of a "display". The HMI 80 may include, for example, a light emitter, a buzzer, a microphone, various operation switches, and keys. The HMI 80 may include, for example, an operator for performing switching between starting or ending of operations of a traveling controller 120 and the navigation device 50, and an operator for selecting a display that displays an image controlled by the HMI controller 150. Details of the HMI 80 will be described below.

The driving assistance device 100 includes, for example, the traveling controller 120 and the HMI controller 150. The traveling controller 120 executes driving assistance control of the vehicle M on the basis of information obtained from the object recognition device 16, the vehicle sensor 40, or the like until an instruction to end the operation of the traveling controller 120 is received or until the vehicle M reaches the destination in a case in which an instruction to start an operation of the traveling controller 120 is received by the HMI 80. For example, when the traveling controller 120 executes the ACC, the traveling controller 120 controls the travel driving force output device 200 and the brake device 210 so that the vehicle M travels in a state in which an inter-vehicle distance between the vehicle M and a preceding vehicle is kept constant, on the basis of information input from the camera 10, the radar device 12, and the finder 14 via the object recognition device 16. That is, the traveling controller 120 performs acceleration and deceleration control (speed control) based on the inter-vehicle distance between the vehicle M and the preceding vehicle. When the traveling controller 120 executes the LKAS, the traveling controller 120 controls the steering device 220 so that the vehicle M travels while keeping a current traveling lane (lane keeping). That is, the driving assistance device 100 performs steering control for keeping the lane. When the traveling controller 120 executes the CMBS, the traveling controller 120 controls the travel driving force output device 200, the brake device 210, and the steering device 220 so that contact with an obstacle that the vehicle M is approaching is avoided. That is, the driving assistance device 100 performs acceleration and deceleration control and steering control for avoiding contact with an object.

The HMI controller 150 outputs information to the occupant through the HMI 80. The HMI controller 150 controls each device mounted in the vehicle M on the basis of information received from the HMI 80. For example, the HMI controller 150 causes information on the road around the vehicle M to be displayed on the HUD 82. The information on the road includes, for example, at least one of a road situation (a road shape or a curvature), information indicating a lane or a traveling direction in which the vehicle M can travel, information on a form of a roundabout and a road at an entrance or exit of the roundabout (for example, a road connected to the roundabout), and information on traffic regulations such as speed limits of a road.

The HMI 80 may cause information on lane change or information on driving assistance to be displayed in a predetermined output aspect on the HMI 80, in addition to the information on the road described above. The information on the lane change includes, for example, guidance information for guiding the occupant about lane change to a recommended lane associated with the route to the destination determined by the navigation device 50. The guidance information includes, for example, information indicating a point at which the lane change starts or a section in which the lane change is allowed, information indicating a lane change destination or a destination direction, and information indicating a timing at which the lane change is performed. The information on the driving assistance includes, for example, information on shapes of surrounding roads, operation statuses of driving assistance functions (for example, ACC, LKAS, and CMBS) that are executed by the driving assistance device 100, information on recommended lanes, and road signs. Details of functions of the HMI controller 150 will be described below.

The travel driving force output device 200 outputs a travel driving force (torque) for traveling of the vehicle M to driving wheels. The travel driving force output device 200 includes, for example, a combination of an internal combustion engine, an electric motor, a transmission, and the like, and an electronic control unit (ECU) that controls these. The brake device 210 includes, for example, a brake caliper, a cylinder that transfers hydraulic pressure to the brake caliper, an electric motor that generates the hydraulic pressure in the cylinder, and a brake ECU. The brake ECU controls the electric motor according to information input from the driving operator 60 or information input from the traveling controller 120 so that a brake torque according to a braking operation is output to each wheel. The steering device 220 includes, for example, a steering ECU and an electric motor. The steering ECU drives the electric motor according to the information input from the driving operator 60 or the information input from the traveling controller 120 to change a direction of steerable wheels.

HMI

Figure 2:
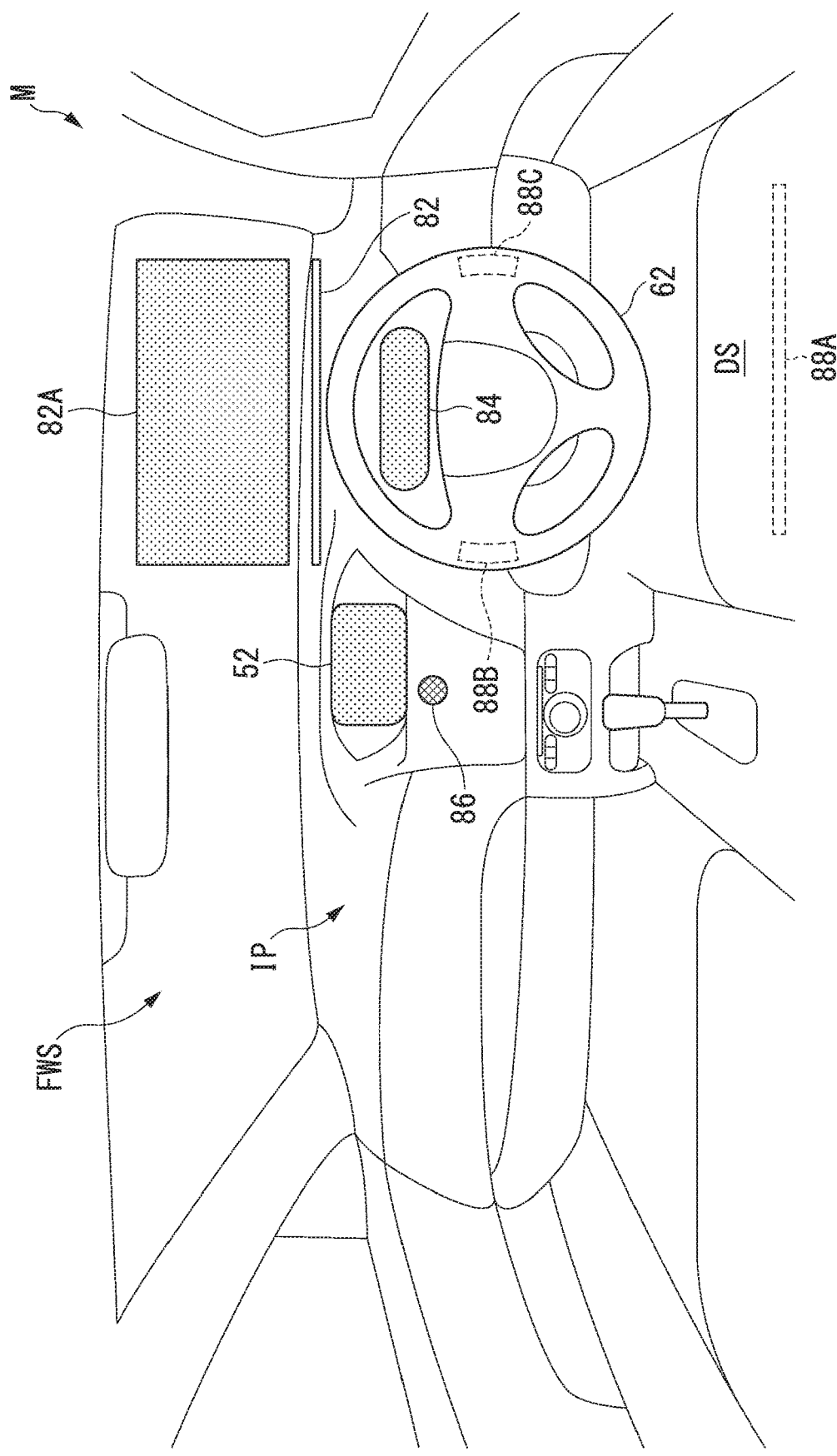
FIG. 2 is a diagram showing a state of a vehicle cabin of a vehicle M in which each unit of an HMI 80 has been mounted.

Next, the HMI 80 will be described. FIG. 2 is a diagram showing an example of a state of a vehicle cabin of the vehicle M in which each unit of the HMI 80 has been mounted. The navigation HMI 52 is a display device such as a liquid crystal display (LCD) or an organic electro luminescence (EL) display disposed at a center of an instrument panel IP, as shown in FIG. 2. The navigation HMI 52 includes, for example, a touch panel that receives an input operation through touch with a finger of the occupant. The navigation HMI 52 displays the shape of the road around the vehicle M acquired using the map information 54, or a map and a route to the destination determined by the route determiner 53. The navigation HMI 52 may output the information on the driving assistance, the information on the lane change, or the like in an output aspect controlled by the HMI controller 150.

The HUD 82 superimposes an image on a landscape in front using an AR technology and causes the image to be visually recognized by the occupant. The HUD 82 is provided on or in the instrument panel IP, for example, as shown in FIG. 2, and projects light including an image onto a display area 82A of a portion of a front windshield FWS in front of a driver's seat DS, so that a virtual image is visually recognized by a driver seated on the driver's seat DS. The front windshield FWS is a member having light transparency. The HUD 82 may be a device that projects light onto a display device having light transparency attached to the front windshield FWS, or to which a display device having light transparency has been attached. Here, the display device may be realized, for example, by a liquid crystal display or an organic EL or may be transparent member (a visor, lenses of glasses, or the like) included in a device mounted in a body of a person.

The HUD 82 causes, for example, an image obtained by converting the information on the road to an image to be visually recognized by a driver as a virtual image in the display aspect controlled by the HMI controller 150. The HUD 82 may cause an image obtained by converting the information on the driving assistance or the information on the lane change to an image to be visually recognized by the driver as the virtual image in the display aspect controlled by the HMI controller 150. The HUD 82 may cause an image obtained by converting a vehicle speed, a driving force distribution ratio, an engine speed, an operation state of a driving assistance function, a shift position, and the like to an image to be visually recognized by the driver as the virtual image in the display aspect controlled by the HMI controller 150. Hereinafter, the HMI controller 150 causing the HUD 82 to execute the above-described process is referred to as "causing an image to be displayed on the HUD 82".

The meter display 84 is, for example, a display device that is provided in the vicinity in front of the driver's seat DS in the instrument panel IP and that the driver can visually recognize in a gap next to a steering wheel 62, which is an example of the driving operator 60, or through the steering wheel 62. The meter display 84 is, for example, a display device such as an LCD or an organic EL display. The meter display 84 displays, for example, instruments such as a speedometer or a tachometer. The meter display 84 may display the information on the road, the information on the lane change, or the information on the driving assistance described above in the output aspect controlled by the HMI controller 150 in an area other than an area in which instruments are displayed.

The speaker 86 is provided in the instrument panel IP, for example. The speaker 86 may be provided on a door, a ceiling, a seat, or the like. The speaker 86 outputs, as a sound, the information on the driving assistance or the information on the lane change to the vehicle cabin in the output aspect controlled by the HMI controller 150.

The vibrator 88 is provided, for example, in the driver's seat DS, the steering wheel 62, or a seat belt. In the example of FIG. 2, a vibrator 88A is provided in the driver's seat DS, and vibrators 88B and 88C are provided to the left and right within the steering wheel 62. The vibrator 88 performs a predetermined vibration at a timing at which the information on the road, the information on the lane change, or the information on the driving assistance is output in the output aspect controlled by the HMI controller 150. The predetermined vibration may be changed, for example, according to a type of information to be output. The output of the vibration from the vibrator 88 allows the driver to feel a vibration of the driver's seat DS or the steering wheel 62 with his or her body or hand and easily ascertain, for example, that the information on the road, the information on the lane change, and the information on the driving assistance are output by the HUD 82, sound, or the like.

HMI Controller

Figure 3:
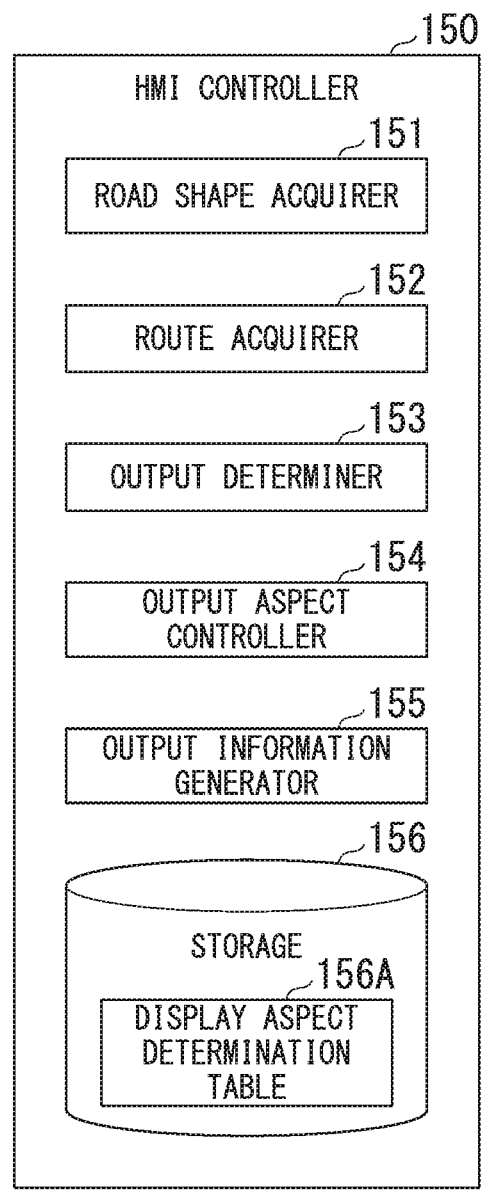
FIG. 3 is a functional configuration diagram of an HMI controller 150 of the embodiment.

Next, a configuration example of the HMI controller 150 will be described. FIG. 3 is a functional configuration diagram of the HMI controller 150 of the embodiment. The HMI controller 150 includes, for example, a road shape acquirer 151, a route acquirer 152, an output determiner 153, an output aspect controller 154, an output information generator 155, and the storage 156. These components are realized, for example, by a hardware processor such as a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU) or may be realized by software and hardware in cooperation. The above-described program may be stored in a storage 156 such as a hard disk drive (HDD) or a flash memory included in the HMI controller 150 in advance or may be stored in a detachable storage medium such as a DVD or a CD-ROM and installed in the storage 156 by the storage medium being mounted in a drive device. A combination of the output determiner 153, the output aspect controller 154, and the output information generator 155 is an example of the "display controller".

The storage 156 is realized by, for example, a hard disk drive (HDD), a flash memory, an electrically erasable programmable read only memory (EEPROM), a read only memory (ROM), or a random access memory (RAM). The storage 156 stores, for example, a display aspect determination table 156A, a program that is read and executed by the processor, and various types of other information. Content of the display aspect determination table 156A will be described below.

The road shape acquirer 151 acquires the information on the road around the vehicle M by referring to the map information 54 on the basis of position information of the vehicle M specified by the GNSS receiver 51. The road shape acquirer 151, for example, may store, in the storage 156, a travel history when the vehicle M has traveled on the same roundabout in the past, and acquire the information on the road on the basis of the stored travel history. The road shape acquirer 151 may acquire a part or all of the information on the road around the vehicle M from information recognized by the object recognition device 16. The road shape acquirer 151 may combine some or all of results acquired by a plurality of acquisition methods described above to acquire information on the road.

The route acquirer 152 acquires the route to the destination when the navigation device 50 is in operation. The route acquirer 152 acquires information on the recommended lane associated with the route.

The output determiner 153 determines, for example, whether or not it is necessary for information to be output on the HMI 80 on the basis of the information on the road acquired by the road shape acquirer 151 or a traveling situation (position information, or the like) of the vehicle M. The output determiner 153 may determine whether or not it is necessary for the information on the lane change or the information on the driving assistance to be output on the HMI 80 on the basis of the information obtained by the navigation device 50, the information recognized by the object recognition device 16, and information on roads acquired by the road shape acquirer 151.

The output aspect controller 154 controls an output aspect for notifying the occupant of the information on the lane change, for example, when the output determiner 153 has determined that it is necessary for the information on the road to be output. A specific example of the output aspect will be described below. Examples of the output aspect in this case include one or more target devices that output information in the HMI 80, a timing at which information is output, a section in which output is continued, and output content.

The output aspect controller 154 may control the output aspect for notifying the driver of the information on the lane change when the output determiner 153 has determined that it is necessary for the information on the lane change to be output. The output aspect controller 154 may control the output aspect for notifying the driver of the information on the driving assistance when the output determiner 153 has determined that it is necessary for the information on the driving assistance to be output.

The output information generator 155 generates information to be output to the occupant in the output aspect set by the output aspect controller 154, and causes the generated information to be output from the target device. For example, when the information on the road is displayed on the HUD 82, the output information generator 155 generates an image corresponding to the information on the road and causes the generated image to be displayed on the target HUD 82. The generated image may include an animation image. When a sound is output by the speaker 86, the output information generator 155 generates a sound corresponding to the information on the road and causes the generated sound to be output by the speaker 86. Examples of the generated sound include a sound for notifying the road shape, and a sound indicating a position and direction of a lane in which the vehicle can travel. When a predetermined vibration is output by the vibrator 88, the output information generator 155 generates vibration information corresponding to the information on the road, and causes the vibrator 88 to vibrate on the basis of the generated vibration information.

The output information generator 155 may generate information for outputting the information on the lane change or the information on the driving assistance to the occupant in the output aspect set by the output aspect controller 154 instead of (or in addition to) the information on the road, and cause the generated information to be output from the target device.

When the navigation device 50 is in operation, the output information generator 155 may acquire information on the route to the destination or the recommended lane associated with the route, generate information to be output to the occupant in the output aspect set by the output aspect controller 154 on the basis of the acquired information, and cause the generated information to be output from the target device.

Next, details of functions of the HMI controller 150 will be described. Hereinafter, determination content in the output determiner 153 and content of output control in the output aspect controller 154 based on the determination content will be mainly described, in which the content is divided into several patterns. Hereinafter, a display control pattern in a case in which an image regarding a road at a roundabout at which the vehicle M is traveling is caused to be displayed on the HUD 82 so that the occupant can visually recognize a road situation, in a state in which route guidance to a destination using the navigation device 50 is not executed, will be described.

First Display Control Pattern

Figure 4:
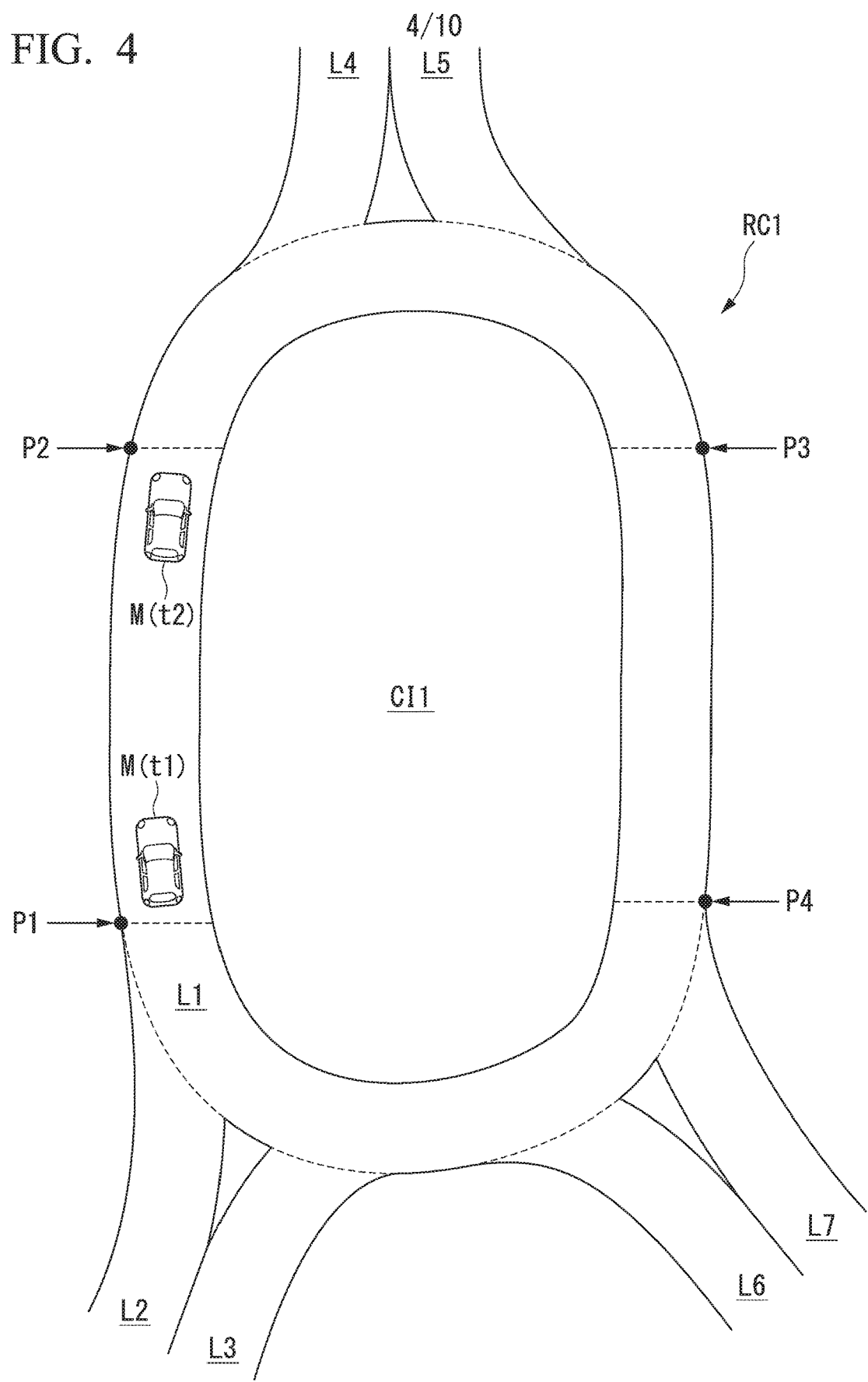
FIG. 4 is a diagram for explaining a first display control pattern of the HMI controller 150.

FIG. 4 is a diagram for explaining a first display control pattern of the HMI controller 150. In an example of FIG. 4, a roundabout RC1 having a central island CH and lanes L2 to L7 connected to a circular road lane L1 of the roundabout RC1 are shown. The lanes L2, L5, and L6 are entrance lanes for entrance to the roundabout RC1. The lanes L3, L4, and L7 are exit lanes for exit from roundabout RC1. The circular road lane L1 in FIG. 4 is assumed to be for passing through clockwise. In the following description, positions of the vehicle at respective times t1 to t3 are denoted as vehicles M(t1) to M(t3).

In the first control pattern, the output determiner 153 determines whether or not the road around the vehicle M includes the roundabout RC1. When the road around the vehicle M includes the roundabout RC1, the output aspect controller 154 causes an image regarding the road to be displayed on the HUD 82. In this case, the output aspect controller 154 changes the display aspect of the image regarding the road displayed on the HUD 82 on the basis of a form of the roundabout.

Specifically, the output aspect controller 154 acquires, for example, a curvature of each road section of the circular road lane L1 from the map information 54 when the vehicle M is traveling in the circular road lane L1 within the roundabout RC1. The output aspect controller 154 determines that the road section is an arc component road when the acquired curvature of the road section is equal to or greater than a first threshold value, and determines that the road section is a road of a straight line component when the curvature is smaller than the first threshold value. The first threshold value may be a predetermined fixed value or may be a variable value that is adjusted using an outer diameter of the roundabout RC1.

In the example of FIG. 4, it is assumed that a section from a point P1 to a point P2 of the circular road lane L1 (hereinafter referred to as a first section) and a section from a point P3 to a point P4 (hereinafter referred to as a second section) have a curvature smaller than a first threshold value. It is assumed that a section from the point P2 to the point P3 (hereinafter referred to as a third section) and a section from the point P4 to the point P1 (hereinafter referred to as a fourth section) of the circular road lane L1 are roads that are regarded as arc components having a curvature equal to or greater than the first threshold value. In this case, the output aspect controller 154 determines that the first section and the second section are road sections of a straight line component, and determines that the third section and the fourth section are road sections of an arc component.

The output aspect controller 154, for example, changes the display aspect of the image regarding the road to be displayed on the HUD 82 according to at which position on the shape component the vehicle M is traveling with respect to the determined shape component, and causes the output information generator 155 to generate an image corresponding to the changed display aspect. The display aspect includes, for example, a shape and type of the image.

For example, the output aspect controller 154 acquires a display aspect of an image associated with the position information of the vehicle M and a form of the roundabout RC1 by referring to the display aspect determination table 156A stored in the storage 156 on the basis of the position information (vehicle position) of the vehicle M and the form of the roundabout RC1.

FIG. 5 is a diagram showing an example of the content of the display aspect determination table 156A. In the display aspect determination table 156A, the display aspect of the image is associated with the vehicle position on or near the roundabout and the form of the roundabout. Examples of the display aspect of the image include a display aspect of a straight line image corresponding to a straight line component of the roundabout RC1, a display aspect of an arc image corresponding to a circular arc component of the roundabout RC1, and a display aspect of an exit lane image corresponding to the exit lane. The display aspect of the straight line image includes, for example, information such as the necessity of a display of the straight line image, a shape (width and length) of the image, color, and a pattern. Examples of the display aspect of the arc image include information such as the necessity of a display of the arc image, or a shape (a width, a length, or a curvature), a color, a pattern, or an inward curving component of the image. The inward curving component is, for example, a component for causing an arc of the image to extend to an inner side, and is a component of a curve approaching a reference point of the curve (for example, a center of an arc when the curve is the arc) in a road width direction as the vehicle M turns. Examples of the display aspect of the exit lane image include information such as the necessity of the exit lane image, or a shape (a width and a length), a color, and a pattern of the image. Examples of the display aspect of the image may include information on a proportion of the straight line image in an image regarding the road shape displayed by the HUD 82 and a proportion of the arc image to the image.

The output aspect controller 154 may include a function for receiving the position information of the vehicle M and information on the form of the roundabout RC1 and outputting the display aspect of the image, instead of the display aspect determination table 156A described above. In this case, the output aspect controller 154 may acquire the display aspect of the image by introducing values into the above-described function. The output aspect controller 154 may update the above-described function by performing machine learning using teacher data based on a previous travel history.

The output information generator 155 generates an image regarding a shape of the roundabout RC1 on the basis of the display aspect of the image acquired by the output aspect controller 154. The output information generator 155 causes the generated image to be displayed at a position at which the generated image is superimposed on or near the road in the landscape in front of the vehicle M when viewed from a position of the line of sight of the driver and visually recognized, on the basis of a position or direction of the vehicle M, information obtained from an image in front of the vehicle M captured by the camera 10, and the like. The position of the line of sight of the driver may be estimated, for example, on the basis of a position or direction of the steering wheel. The position of the line of sight of the driver may be acquired through analysis of an image captured by a vehicle cabin camera (not shown) that images a vehicle cabin.

Figure 6:
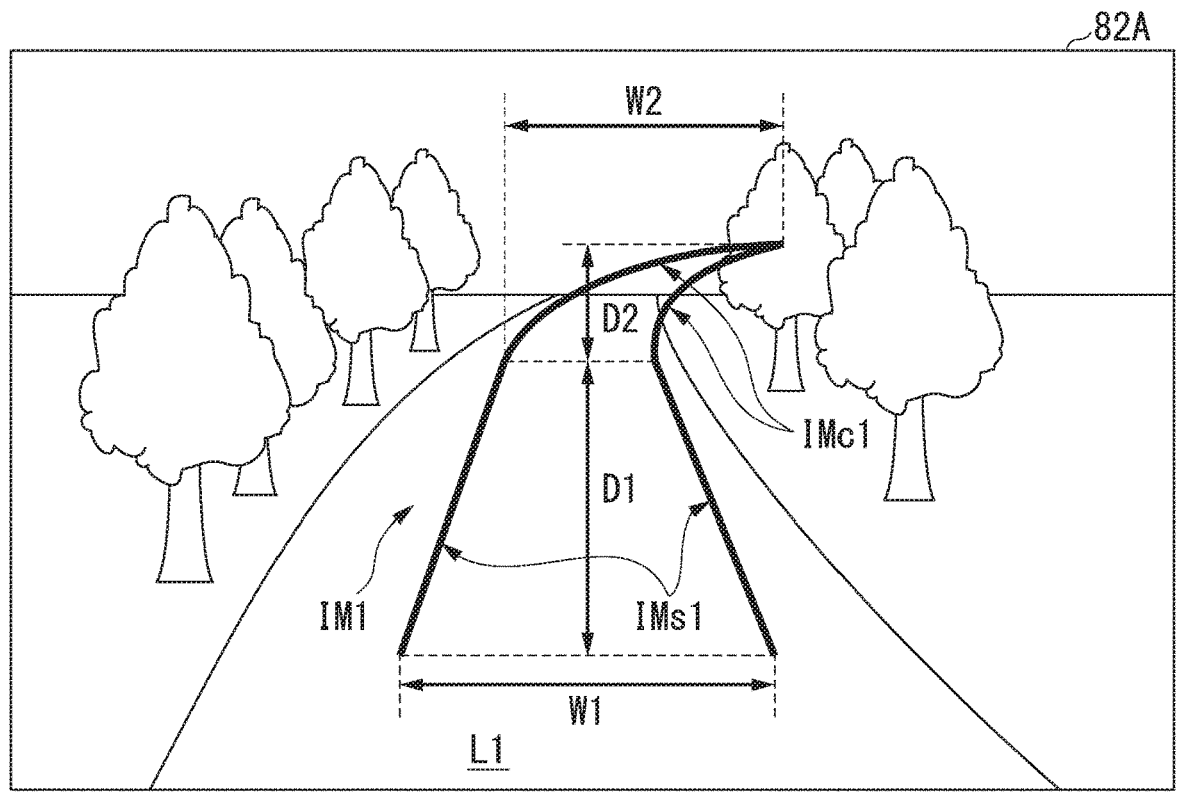
FIG. 6 is a diagram showing an example of an image that is superimposed on a landscape in front of a vehicle M(t1) at time t1.

FIG. 6 is a diagram showing an example of an image that is superimposed on a landscape in front of the vehicle M(t1) at time t1. In the example of FIG. 6, an example of an image IM1 regarding a road superimposed on a landscape, which is visually recognized within the display area 82A of the front windshield FWS on the HUD 82 is shown.

As described above, since the roundabout RC1 includes the straight line component, the output aspect controller 154 causes, as the image IM1 relevant to the road, an arc image IMc1 associated with the arc component of the roundabout RC1 to be displayed on the HUD 82 and a straight line image IMs1 associated with the straight line component to be displayed on the HUD 82.

In the example of FIG. 6, in the arc image IMc1, two curves having a predetermined color or pattern extend in the traveling direction of the vehicle M in association with the road shape of the arc component. In the straight line image IMs1, two straight lines having a predetermined color or pattern extend in the traveling direction of the vehicle M along a shape of the road of the straight line component. The curve image IMc1 or the straight line image IMs1 may have the same color or pattern or may have different colors or patterns. The curve image IMc1 or the straight line image IMs1 may be an image in which an area between two curves or straight lines is filled with a color or pattern having a predetermined transmittance. The curve image IMc1 or the straight line image IMs1 may be an image including a shape such as an arrow indicating the traveling direction.

At time t1, there is the road of the straight line component at a predetermined position in front at which the driver of the vehicle M(t1) can visually recognize, and a road of an arc component ahead thereof. Therefore, the output information generator 155 causes the straight line image to be displayed so that the straight line image extends downward (in the direction of the vehicle M) from the vicinity of a lower end at the position at which the arc image IMc1 is displayed, as shown in FIG. 6. The vicinity of the lower end is, for example, a position in contact with a lower end of the arc image or within a predetermined distance from the lower end.

The output information generator 155 causes the straight line image IMs1 to be displayed on the HUD 82 so that the straight line image IMs1 is superimposed on the circular road lane L1 in which the vehicle M travels, and visually recognized. At time t1, there is no road of an arc component at a position in front that can be visually recognized by the driver of the vehicle M. In such a case, the output information generator 155 causes the arc image IMc1 to be displayed so that the arc image IMc1 is superimposed on a landscape in front in a direction in which there is the road of the arc component, as shown in the example of FIG. 6, on the basis of a situation of surroundings obtained from the map information 54 and the position information of the vehicle M. Accordingly, it is possible to allow the occupant to ascertain a shape of the road of the arc component before the vehicle M reaches a position at which a real road including the arc component is visually recognized by the occupant.

Lengths D1 and D2 in a forward direction of the vehicle M (in other words, a vertical direction in the display area 82A) and widths W1 and W2 in a horizontal direction of the vehicle M (in other words, a horizontal direction in the display area 82A) in the straight line image IMs1 and the arc image IMc1 are generated on the basis of the display aspect of the image set by the output aspect controller 154.

The exit lane (for example, the lane L4) cannot be visually recognized from the position of the vehicle M(t1) at time t1. Therefore, the output information generator 155 does not cause an image regarding the exit lane to be visually recognized on the HUD 82 at this point in time. Accordingly, it is possible to curb the occupant misunderstanding that a portion that is not actually an exit is an exit.

Figure 7:
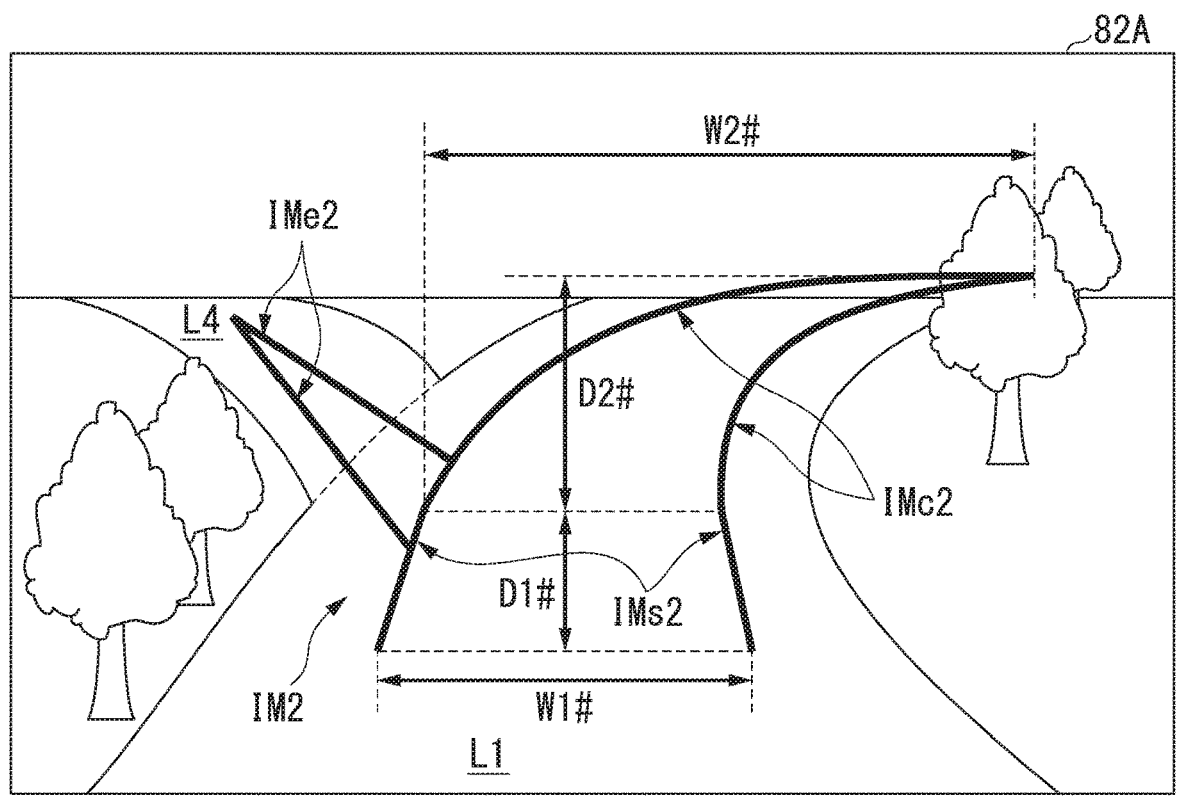
FIG. 7 is a diagram showing an example of an image that is superimposed on a landscape in front of a vehicle M(t2) at time t2.

FIG. 7 is a diagram showing an example of an image that is superimposed on a landscape in front of the vehicle M(t2) at time t2. In the example of FIG. 7, an example of an image IM2 regarding a road superimposed on a landscape that is visually recognized within the display area 82A of the front windshield FWS by the HUD 82 is shown. The image IM2 includes a curve image IMc2 and a straight line image IMs2 at time t2.

At the position of the vehicle M(t2) at time t2, a length of a road having a straight line component ahead thereof is shorter than at the position of the vehicle M(t1) at time t1. Therefore, the output information generator 155 makes a length D1# of the straight line image IMs2 in the forward direction of the vehicle M shorter than the length D1 at time t1 and a length D2# of the arc image IMc2 in the forward direction of the vehicle M longer than the length D2 at time t1, on the basis of the display aspect in the display aspect determination table 156A, and causes the images to be displayed on the HUD 82. In this case, the output information generator 155 may change the display aspect so that a sum of the lengths D1 and D2 of the images at time t1 is the same as a sum of the lengths D1# and D2# of the images at time t2. Accordingly, it is possible to cause the driver to ascertain a relationship (a proportion or the like) between the arc image and the straight line image without excessively changing the line of sight.

The output information generator 155 makes a width W1# of the straight line image IMs2 in a horizontal direction at time t2 equal to the width W1 at time t1, and a width W2# of the curve image IMc2 in a horizontal direction greater than the width W1 at time t1. Specifically, when the output information generator 155 changes the length of the straight line image, the output information generator 155 causes an image in which a distal end portion of the arc image IMc2 has extended to correspond to a curvature of the arc component on the basis of the change in the length D1# of the straight line image IMs2 to be displayed on the HUD 82. Accordingly, it is possible to cause the driver to more accurately ascertain that the driver is approaching the road including the arc component and the road of the arc component is extending.

When it is estimated that the position of the vehicle M has reached a position at which the exit lane can be visually recognized, the output information generator 155 causes an image regarding the exit lane (hereinafter referred to as an exit image) IMe2 to be superimposed and displayed at a position at which the image is superimposed on the exit lane L4 and visually recognized on the basis of the line of sight of the driver, on the basis of the display aspect in the display aspect determination table 156A. The position at which the exit lane can be visually recognized is, for example, a position at which a distance from the exit is smaller than a predetermined distance and a direction of the vehicle M traveling ahead of the exit is within a predetermined angle with respect to the exit.

The output information generator 155 causes an exit image IMe2 to be displayed in association with the vicinity of the arc image IMc2 or the straight line image IMs2. The vicinity of the image is, for example, a position with which the image is in contact or a position within a predetermined distance from the image. A color or pattern of the exit image IMe2 may be the same as or different from the arc image IMc2 or the straight line image IMs2. For example, the output information generator 155 may cause an exit lane directed in a destination direction set by the navigation device 50 to be displayed in a color different from that of the arc image IMc2 or the straight line image IMs2, and cause a lane that is not an exit lane directed in the destination direction, to be displayed in the same color as that of the arc image IMc2 or the straight line image IMs2. Accordingly, it is possible to cause the driver to ascertain an exit direction more accurately.

Second Display Control Pattern

Figure 8:
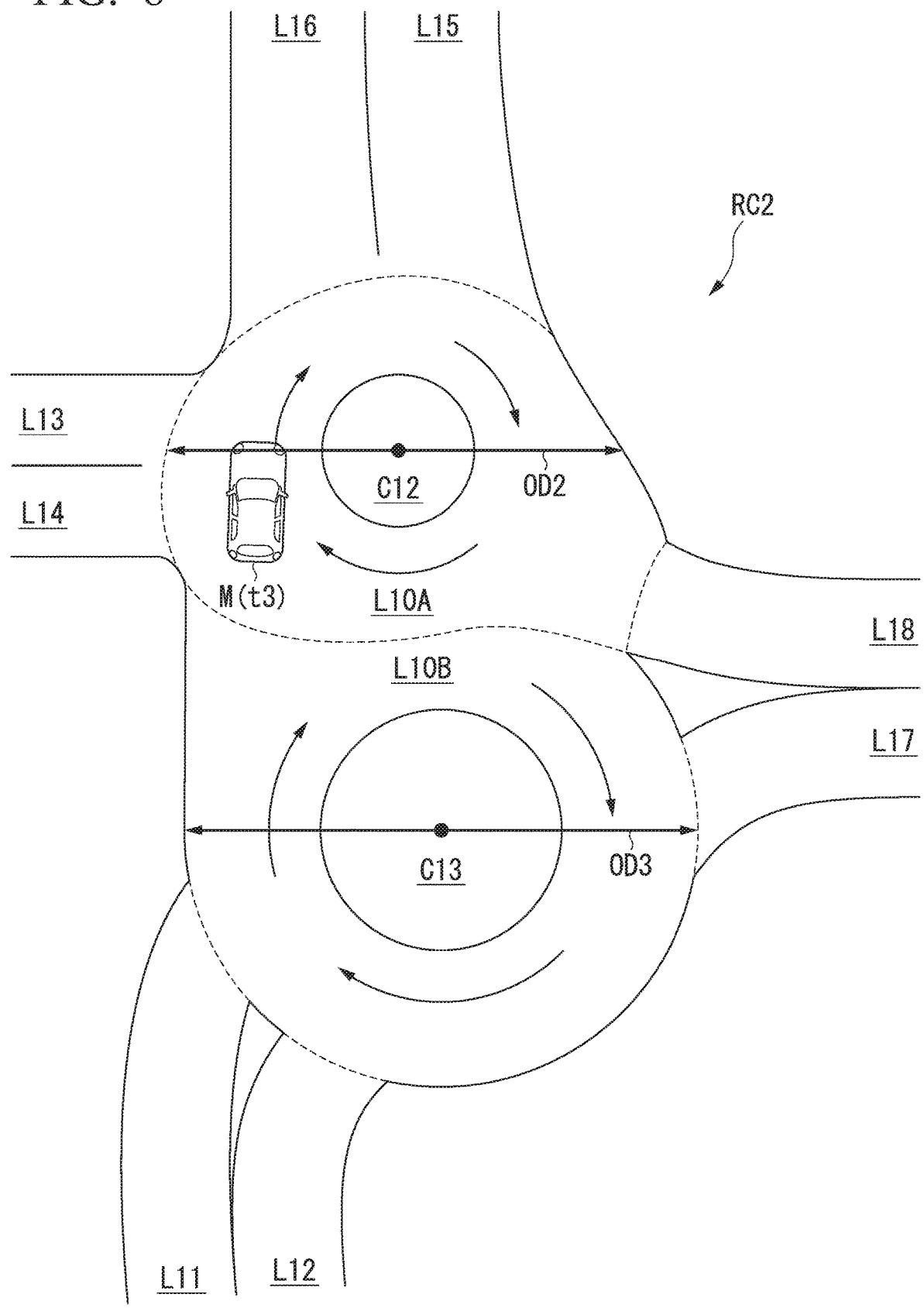
FIG. 8 is a diagram for explaining a second display control pattern of output control of the HMI controller 150.

FIG. 8 is a diagram for explaining a second display control pattern of the output control of the HMI controller 150. In an example of FIG. 8, a roundabout RC2 having two central islands CI2 and CI3, and lanes L11 to L18 connected to the circular road lane L1 of the roundabout RC1. The lanes L11, L13, L15, and L17 are entrance lanes for entrance to the roundabout RC2. The lanes L12, L14, L16, and L18 are exit lanes for exit from roundabout RC2. The roundabout RC2 includes a circular road lane L10A around a central island CI2 and a circular road lane L10B around a central island CI3. In the example of FIG. 8, it is assumed that there is no road of the straight line component in the roundabout RC2.

In the second display control pattern, a display aspect of an image that is displayed on the HUD 82 is changed on the basis of the position of the vehicle M and whether or not outer diameters OD2 and OD3 of the circular road lanes L10A and L10B around the central islands CI2 and CI3 of the roundabout RC2 are equal to or greater than a threshold value, on the basis of the display aspect in the display aspect determination table 156A.

Figure 9:
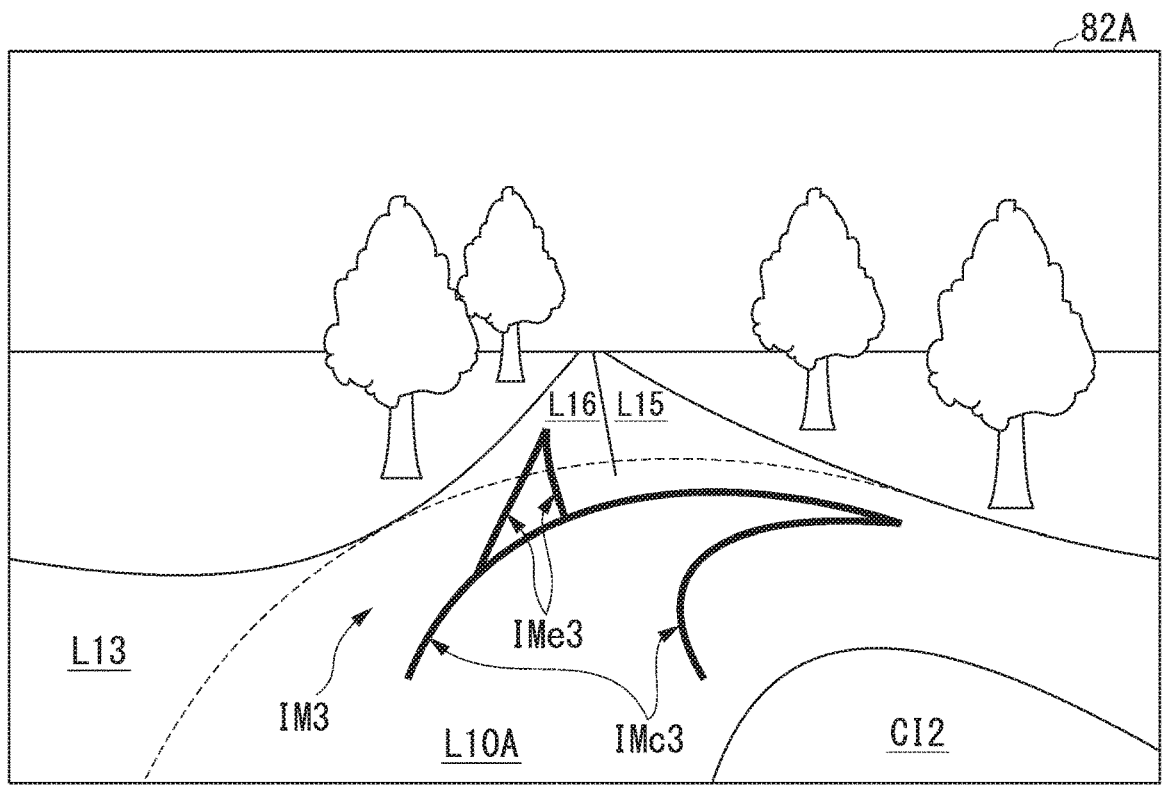
FIG. 9 is a diagram showing an example of an image that is superimposed on a landscape in front when an outer diameter OD2 of a circular road lane L10A in which the vehicle M travels is equal to or greater than a predetermined value.

FIG. 9 is a diagram showing an example of an image that is superimposed on a landscape in front when the outer diameter OD2 of the circular road lane L10A in which the vehicle M travels is equal to or greater than a predetermined value. In the example of FIG. 9, an example of an image IM3 regarding a road superimposed on a landscape, which is visually recognized within the display area 82A of the front windshield FWS on the HUD 82 from the position of the vehicle M(t3) at time t3 is shown. The image IM3 includes an arc image IMc3 and an exit image IMe3.

Since the roundabout RC2 does not include a straight line component, the output information generator 155 causes the arc image IMc3 associated with the arc component of the roundabout RC1 to be displayed on the HUD 82 as the image IM3 regarding the road, on the basis of the display aspect in the display aspect determination table 156A. The output information generator 155 causes the exit image IMe3 associated with the exit lane L14 that is visually recognized by the driver, which is within a predetermined distance from the vehicle M(t3), to be displayed on the HUD 82. In the example of FIG. 9, the output information generator 155 causes the arc image IMc3 to be displayed on the HUD 82 so that the driver visually recognizes the arc image IMc3 superimposed on the circular road lane L10A, and causes the exit image IMe3 to be displayed on the HUD 82 so that the exit image IMe3 extends to the lane L16 from the vicinity of the arc image IMc3.

Here, when the outer diameter OD2 is equal to or greater than the predetermined value, it is estimated that the vehicle M turns with a relatively great arc and there is time allowance to visually recognize the exit lane ahead of the vehicle M. Therefore, the output information generator 155 causes the exit image that cannot be visually recognized by the occupant not to be displayed on the basis of the display aspect in the display aspect determination table 156A.

Figure 10:
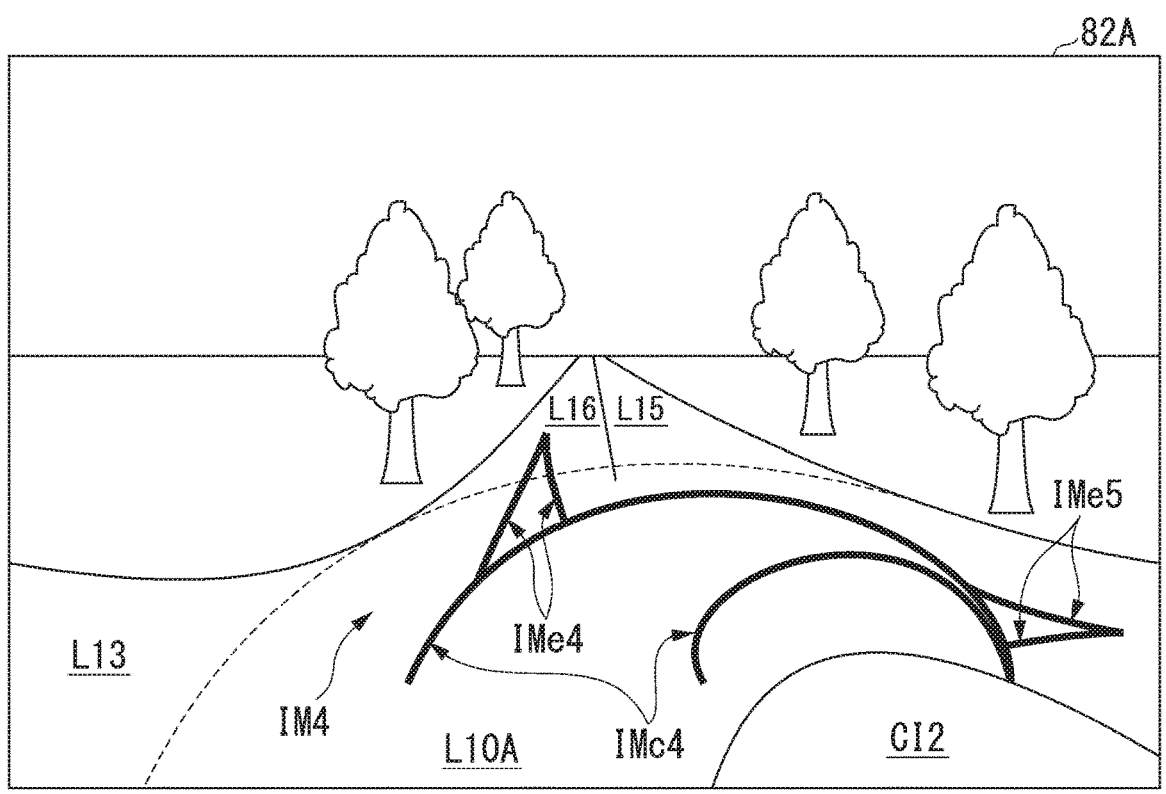
FIG. 10 is a diagram showing an example of an image that is superimposed on the landscape in front when the outer diameter OD2 of the circular road L10A on which the vehicle M travels is smaller than the predetermined value.

FIG. 10 is a diagram showing an example of an image that is superimposed on a landscape in front when the outer diameter OD2 of the circular road lane L10A on which the vehicle M travels is smaller than the predetermined value. In the example of FIG. 10, an example of an image IM4 regarding a road superimposed on a landscape that is visually recognized within the display area 82A of the front windshield FWS by the HUD 82 from the position of the vehicle M(t3) at time t3 is shown. The image IM4 includes an arc image IMc4 and exit images IMe4 and IMe5.

When the outer diameter OD2 of the circular road lane L10A is smaller than the predetermined value, it is estimated that the vehicle M turns with a relatively small arc and there is no time allowance to visually recognize the exit lane ahead of the vehicle M. Therefore, the output information generator 155 causes the exit image IMe5 corresponding to the exit lane L18 that cannot be visually recognized by the driver of the vehicle M(t3) to be displayed on the HUD 82, on the basis of the display aspect in the display aspect determination table 156A. The output information generator 155 causes a distal end portion of the arc image viewed from the vehicle M(t3) to be displayed so that the distal end portion includes an inward curving component in a direction in which a circle is drawn, thereby showing that the outer diameter OD2 of the circular road lane L10A is smaller than the predetermined value and the arc is small. Accordingly, the driver can be caused to more accurately ascertain that the arc of the arc component road is small.

In the display aspect of the second display control pattern described above, the display aspect may be changed as described above using a curvature with respect to the circular road lane L10A instead of the outer diameter. According to the second display control pattern described above, when the outer diameter is large (the curvature is small), the exit image is not displayed since there is a travel distance to the exit, and when the outer diameter is small (the curvature is large), the exit image is displayed before the exit comes into a field of view of the driver, such that the exit image can be displayed at a more appropriate timing. In the second display control pattern, the display aspect is changed when the arc is small such that the occupant can ascertain a road situation more accurately and drive in peace. In the first display control pattern or the second display control pattern, some or all of other display control patterns may be combined.

Processing Flow

Figure 11:
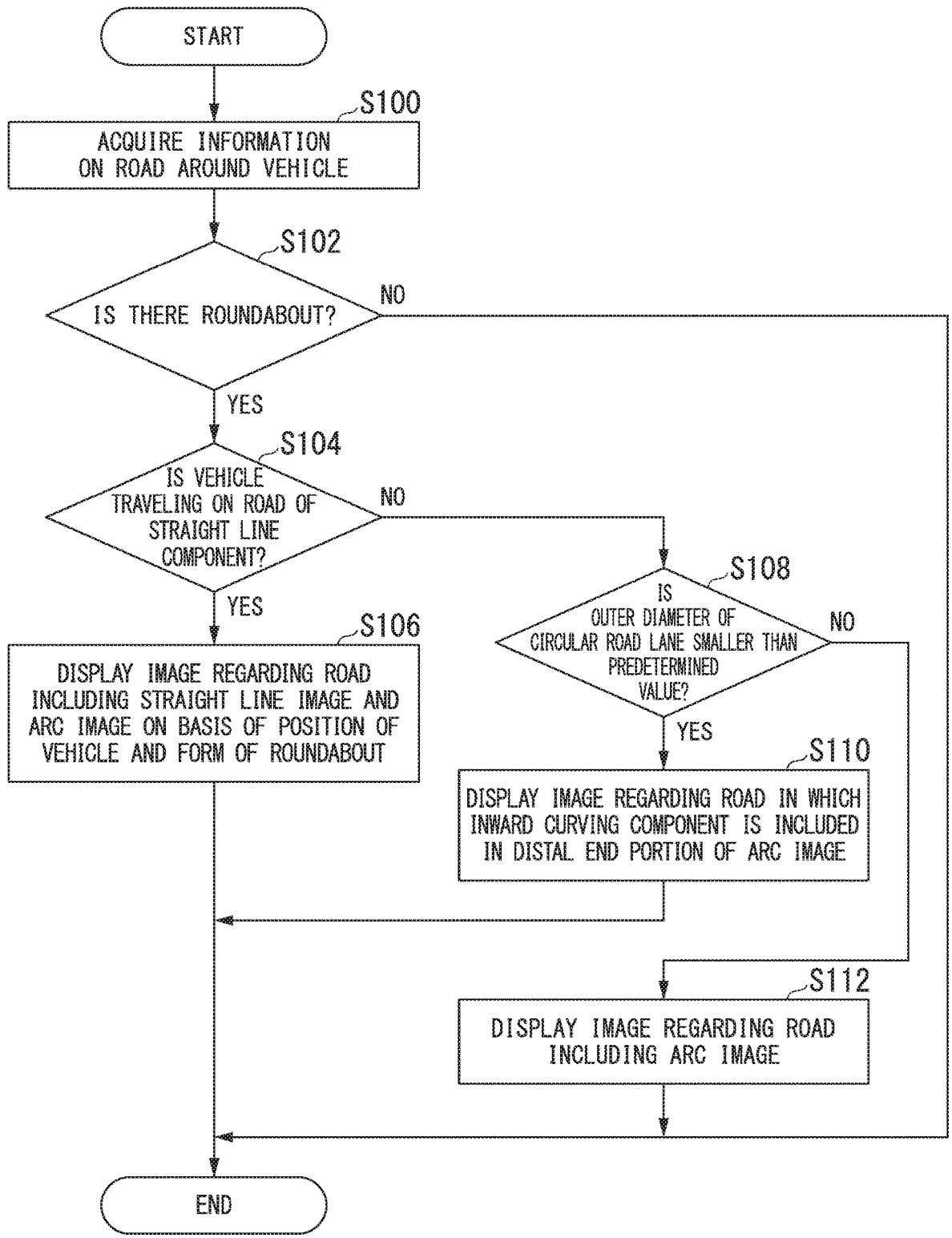
FIG. 11 is a flowchart showing an example of a flow of a process of the HMI controller 150.

FIG. 11 is a flowchart showing an example of a flow of a process of the HMI controller 150. The process shown in FIG. 11 may be repeatedly executed at a predetermined timing or cycle. For example, the process shown in FIG. 11 is repeatedly executed when a roundabout is present around the vehicle M. The process shown in FIG. 11 is an example of a process in which the first display control pattern and the second display control pattern are combined.

In the example of FIG. 11, first, the road shape acquirer 151 acquires the information on the road around the vehicle M (step S100). Then, the output determiner 153 determines whether or not there is a roundabout around the vehicle M on the basis of the acquired information on the road (step S102). When there is a roundabout, the output aspect controller 154 determines whether or not there is the road of the straight line component (step S104). When the vehicle M travels on the road of the straight line component, the output information generator 155 generates an image regarding a road including a straight line image and an arc image on the basis of a position of the vehicle M and a form of the roundabout, and causes the generated image to be displayed on the HUD 82 (step S106).

In the process of step S104, when the vehicle is not traveling on the road of the straight line component, it is determined whether or not an outer diameter of the circular road lane is smaller than a predetermined value (step S108). When the outer diameter of the circular road lane is smaller than the predetermined value, the output information generator 155 causes an image regarding the road in which an inward curving component is included in a distal end portion of the arc image to be displayed (step S110). When the outer diameter of the circular road lane is equal to or greater than the predetermined value, the output information generator 155 causes an image regarding the road including the arc image to be displayed (step S112). Thereby, the process of this flowchart ends.

When there is no roundabout in the process of step S102, the process of this flowchart ends. Although the image display regarding each display aspect of the roundabout in the process of FIG. 11 has been described, the information on the lane change or the information on the driving assistance may be displayed on the HUD 82, in addition to the image display regarding the roundabout. Information on the roundabout may be output by a sound or vibration, in addition to the process of FIG. 11.

According to the embodiment described above, it is possible to allow the occupant to ascertain a road situation at the roundabout more accurately. Specifically, according to the embodiment, it is possible to recognize the shape of the roundabout or an exit direction from the image displayed on the HUD 82 while confirming surrounding traffic information. Therefore, since the driver can easily understand the roundabout or an exit from the roundabout, the driver can drive with ease without being confused.

Hardware Configuration

Figure 12:
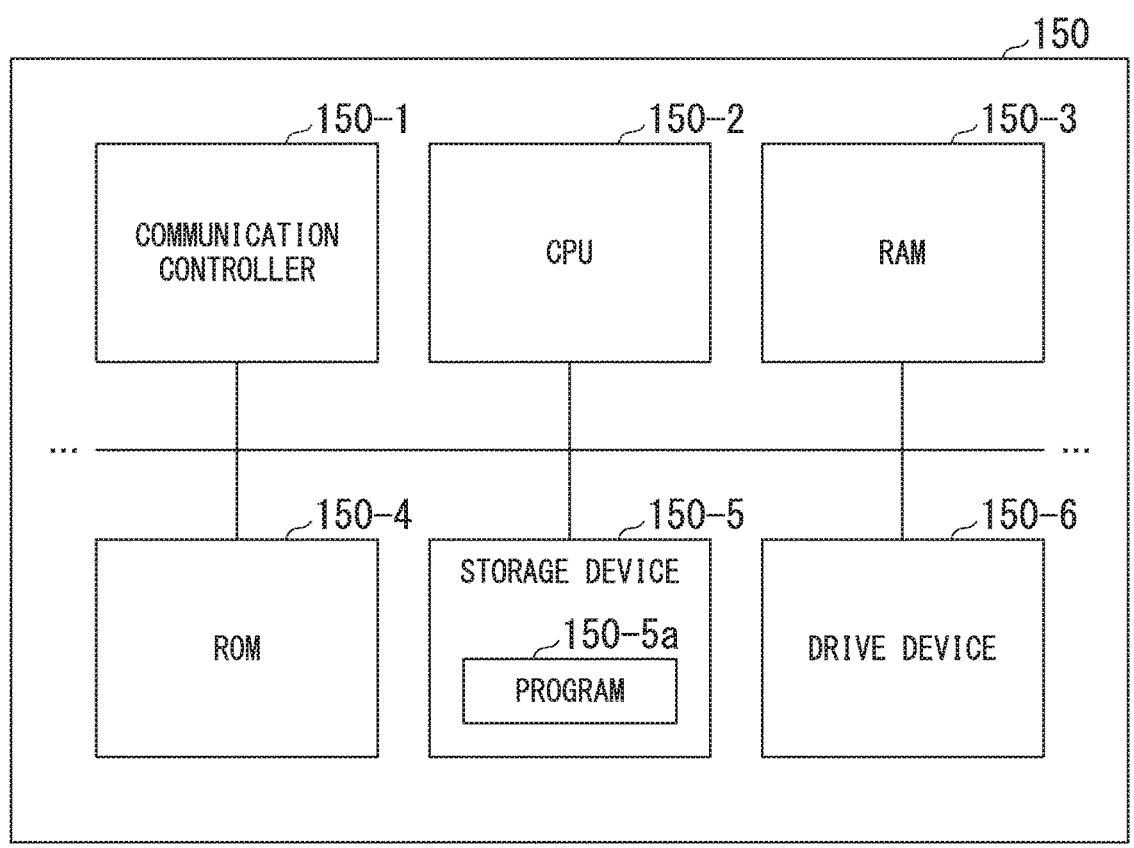
FIG. 12 is a diagram showing an example of a hardware configuration of the HMI controller 150 according to the embodiment.

The HMI controller 150 of the display system of the embodiment described above is realized by, for example, a configuration of computer hardware as shown in FIG. 12. FIG. 12 is a diagram showing an example of a hardware configuration of the HMI controller 150 according to the embodiment.

The HMI controller 150 has a configuration in which a communication controller 150-1, a CPU 150-2, a RAM 150-3, a ROM 150-4, a storage device 150-5 such as a flash memory or an HDD, and a drive device 150-6 are connected to each other by an internal bus or a dedicated communication line. A portable storage medium such as an optical disc is mounted in the drive device 150-6. A program 150-5*a* stored in the storage device 150-5 is developed into the RAM 150-3 by a DMA controller (not shown) or the like and executed by the CPU 150-2, thereby realizing functions of respective constituents of the HMI controller 150. A program referred to by the CPU 150-2 may be stored in a portable storage medium mounted in the drive device 150-6 or may be downloaded from another device via a network NW.

The above embodiment can be represented as follows.

A display system including a display that superimposes an image on a landscape in front of a vehicle and causes the image to be visually recognized by an occupant of the vehicle, a storage device, and a hardware processor that executes a program stored in the storage device, in which the hardware processor is configured to acquire information indicating a shape of a road around the vehicle, and change a display aspect of an image regarding a road to be displayed on the display, on the basis of a form of a roundabout including one or both of a shape component and an outer diameter of the roundabout obtained from the information when the roundabout has been determined to be included in the road shape by referring to the acquired information, by executing the program.

Although a mode for carrying out the present invention has been described above using the embodiment, the present invention is not limited to the embodiment at all, and various modifications and substitutions may be made without departing from the spirit of the present invention.

What is claimed is:

1. A display system comprising:
   a display configured to superimpose an image on a landscape in front of a vehicle and cause the image to be visually recognized by an occupant of the vehicle;
   a road shape acquirer configured to acquire information indicating a shape of a road around the vehicle; and
   a display controller configured to change a display aspect of an image regarding a road to be displayed on the display, on the basis of a form of a roundabout including one or both of a shape component and an outer diameter of the roundabout obtained from the information in a case that the roundabout has been determined to be included in the road shape by referring to the information acquired by the road shape acquirer.

2. The display system according to claim 1, wherein the display controller causes an arc image associated with a curvature of the road shape of the roundabout to be displayed on the display, and includes, in an image to be displayed on the display, a straight line image associated with a straight line component in a case that the straight line component is included in the road shape of the roundabout.

3. The display system according to claim 2, wherein the display controller changes a length of the straight line image to be displayed on the display, on the basis of a position of the vehicle and a form of the roundabout in a case that the vehicle travels on a road of the straight line component.

4. The display system according to claim 3, wherein in a case that the display controller changes the length of the straight line image to be displayed on the display, the display controller causes an image with a distal end portion of the arc image extending in association with the curvature to be displayed on the display, on the basis of the change in the length of the straight line image.

5. The display system according to claim 2, wherein in a case that the outer diameter of the roundabout is smaller than a predetermined value, the display controller causes an image with a component of a curve included in a distal end portion of the arc image to be displayed on the display, the component of the curve approaching a reference point of the curve in a road width direction as the vehicle turns.

6. The display system according to claim 1, wherein the display controller causes an image regarding an exit of the roundabout to be displayed at a position associated with an image regarding the roundabout.

7. A display control method performed using a computer comprising:
   acquiring information indicating a shape of a road around a vehicle; and
   changing a display aspect of an image regarding a road to be displayed on a display, the display superimposing an image on a landscape in front of the vehicle and causing the image to be visually recognized by an occupant of the vehicle, on the basis of a form of a roundabout including one or both of a shape component and an outer diameter of the roundabout obtained from the information in a case that the roundabout has been determined to be included in the road shape by referring to the acquired information.

8. A computer-readable non-transitory storage medium storing a program, the program causing a computer to:
   acquire information indicating a shape of a road around a vehicle; and
   change a display aspect of an image regarding a road to be displayed on a display, the display superimposing an image on a landscape in front of the vehicle and causing the image to be visually recognized by an occupant of the vehicle, on the basis of a form of a roundabout including one or both of a shape component and an outer diameter of the roundabout obtained from the information in a case that the roundabout has been determined to be included in the road shape by referring to the acquired information.

* * * * *